UNITED STATES PATENT OFFICE

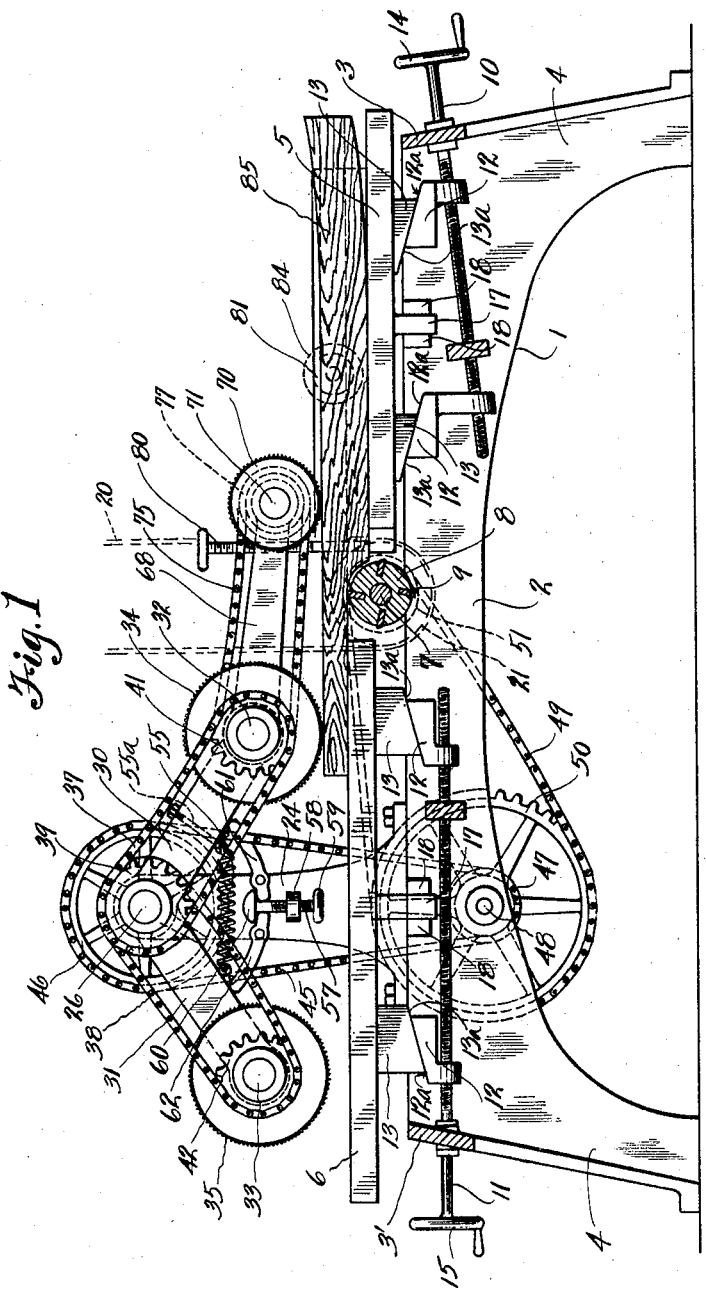

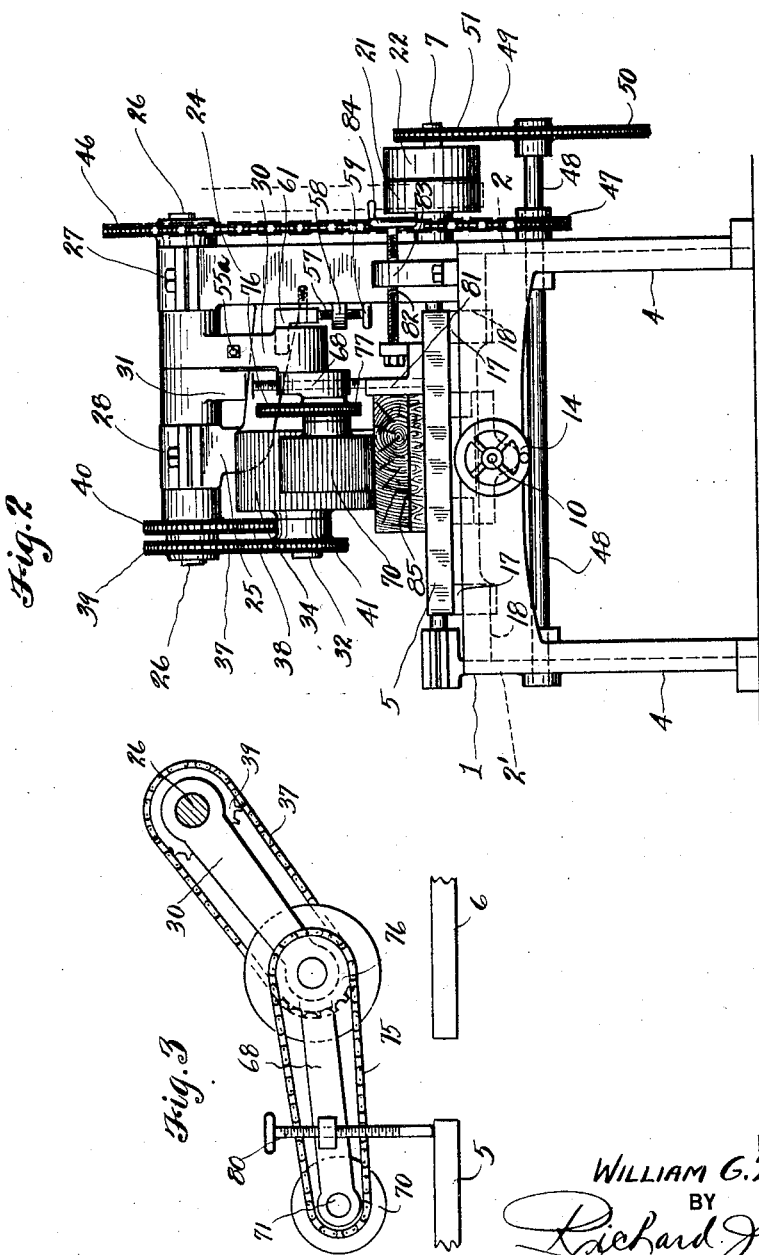

WILLIAM G. ZIMMERMAN, OF EVERETT, WASHINGTON; ISABELLA V. ZIMMERMAN AND O. L. WEST EXECUTORS OF SAID WILLIAM G. ZIMMERMAN, DECEASED

JOINER

Application filed May 16, 1927. Serial No. 191,797.

The invention relates to improvements in machines generally known as joiners and which are used for planing the surfaces of boards to leave them smooth and true; the principal object of the present invention being to provide means for automatically feeding warped or uneven boards into the machine and for holding them properly in position while they are advanced against the cutters so as to insure a true and even surface when the board comes from the machine.

More specifically stated, the object of the invention resides in the provision in a machine of the above character of adjustable tables across which the boards are advanced and whereby the position of the boards relative to the cutters may be adjusted so as to cut to a greater or lesser depth as is determined by the extent to which the piece is warped and to provide weighted feed rollers whereby the pieces are automatically fed to the cutters and are held flat against the planing tables as they are advanced so as to avoid any unevenness in the surfaces of the finished product.

Other objects of the invention reside in the details of construction of the table adjusting means and feed roller adjusting and driving means as is hereinafter described.

In accomplishing these and other objects of the invention, I have provided the improved details of construction, the preferred forms of which are illustrated in the accompanying drawings, wherein—

Figure 1 is a side view of a joiner embodying the present invention; the base of the machine being shown in vertical section to illustrate the adjustable mountings of the plane tables.

Figure 2 is an end elevation of the machine.

Figure 3 is a detail view, showing the drive of the feed rollers.

Referring more in detail to the drawings—

1 designates, in its entirety, the base portion of the machine comprising the opposite side frames 2 and 2', opposite end frames 3 and 3' and the corner supporting legs 4.

Mounted on the base are horizontal, plane tables 5 and 6; the table 5 being located at one end and the table 6 at the other end with their adjacent ends spaced apart for the mounting between them of a transverse shaft 7 on which a revolving cutter 8 is mounted and which is adapted to plane off the under surfaces of boards that are passed from the table 5 onto the table 6. In its preferred form, the cutter is of cylindrical form and has four longitudinally extending cutters, or knives, 9 therein which operate against the boards as they are advanced.

The tables 5 and 6 are vertically adjustable, each by an independently operable means consisting of the shafts 10 and 11 which are mounted beneath the tables in the lengthwise direction of the base and are fixed revolubly in the end frames 3—3' and have their inner portions threaded through spaced apart blocks 12 provided with inclined upper surfaces 12ª which bear against oppositely inclined surfaces 13ª of blocks 13 that are fixed to the under sides of the tables. At the outer ends of these shafts are wheels 14 and 15 whereby they may be rotated to cause the blocks 12 to move inwardly or outwardly therealong and to move along the inclined surfaces of the blocks 13 to thereby cause the tables to be adjusted vertically; the tables being held against longitudinal shifting but are permitted to move in a vertical direction by means of posts 17 that extend downwardly from their opposite edges between spaced guide blocks 18—18' formed on the insides of the side frames 2—2'.

The cutter shaft 7 is driven by means of a belt 20 which operates about a belt pulley 21 on one end of the shaft, and an idler wheel 22 is mounted on the shaft adjacent wheel 21 onto which the belt may be shifted when it is desired to stop the machine.

Erected upon the side frames 2, centrally at one side of the table 6, is a standard 24 and to this bracket 25 is attached to extend above the table. A shaft 26 is mounted horizontally and transversely above the table in bearings 27 and 28 provided respectively in the upper end of the standard and bracket, and pivotally suspended from this shaft, between the bearings, are oppositely directed arms 30 and 31 which, at their lower ends, have shafts 32 and 33 revolubly mounted therein on which rollers 34 and 35 are fixed. These rollers are in alinement centrally over the longitudinal line of the tables 5 and 6 and are exteriorly knurled or corrugated so that, when driven in contact with a board beneath them, they will grip and advance the board forwardly. These two rollers are adapted to be driven from the shaft 26 by means of sprocket chain belts 37 and 38 which operate about sprocket wheels 39 and 40 on the shaft 26 and about sprocket wheels 41 and 42 that are fixed respectively on the inner end of the roller mounting shafts 32 and 33. The shaft 26 is adapted to be revolubly driven by a sprocket chain belt 45 that operates over a relatively large sprocket wheel 46 on shaft 26 and over a small sprocket wheel 47 that is fixed on a shaft 48 mounted transversely of the frame below the table 6 and which, in turn, is driven by a sprocket chain belt 49 that operates over a sprocket wheel 50 on the shaft 48 and a sprocket wheel 51 on the cutter shaft 7.

The two arms 30 and 31 extend downwardly in diverging relation so that the rollers at their lower ends are in rolling contact with boards advanced beneath them and a coiled spring 55 is attached at its ends to the arms to draw them together and hold them tightly against the board. The distance of the rollers above the table 6 is to be regulated in accordance with the thickness of the board to be advanced beneath them and they may be adjusted and held at any set position against the pull of the spring 55 by an adjusting screw 57 that is mounted vertically in a bearing 58 formed on the inner side of standard 24. This has a wheel 59 at its lower end whereby it may be rotated and at its upper end has a head 60 that engages with the inner ends of two levers 61 and 62 which are pivotally supported from the standard with their outer ends in supporting contact with the arms 30—31. By manipulation of the adjusting screw 57 the arms may be raised or lowered as is desired and will be held at any adjusted position. The tension of spring 55 may be varied by adjustment of a bolt 55ª which connects one end of the spring with the arm 30.

Pivotally attached at one end to the shaft 33 on which the roller 31 is mounted, is an arm 68 which extends over the table 5 and at its end has a roller 70 mounted thereon by a shaft 71 revoluble in the end of the arm. This roller 70 is alined with the rollers 34 and 35 and also has a knurled or roughened surface and is revoluble driven by means of a sprocket chain belt 75 which operates over a sprocket wheel 76 on the shaft 33 and a sprocket wheel 77 on shaft 71.

The distance of the roller 70 above the table may be controlled by a set screw 80 that is threaded downwardly through an arm to engage with the top of the table.

I have also provided a board guide flange 81 longitudinally of the table 5 against which the boards may be placed for advancement to the rollers and cutter. This guide may be adjusted laterally by means of a screw 82 that is mounted transversely of the table in a bearing 83 and at its inner end is revolubly fixed to the guide and at its outer end has a wheel 84 whereby it may rotated to adjust the guide.

Assuming the parts of the machine to be so constructed and assembled and adapted to be driven as described, its operation would be as follows: First, the feed rollers 34 and 35 and 70 are properly set above the table 6; this being determined by the thickness of the piece to be surfaced. For a piece of material 3 inches thick and warped slightly, the rollers are adjusted approximately 2½ inches above the table. The table 5 is then adjusted sufficient distance below the surface of the cutter 8 that it will cut out any warped or cupped surface of the board to be passed over it. In Figure 1 of the drawings, the setting of the table is exaggerated in order to better illustrate the operation.

The selected board, as indicated at 85 in Figure 1, is then started across the tables, it first being passed under the roller 70 which holds and advances it against the cutter and the board then passes onto table 6 and the planed surface is held tightly against the table top by the downward pressure of the roller 35 and then, as it advances farther, by the roller 34; these latter rollers, being driven, serve also to feed the board forwardly through the machine. This operation planes off the under side of the board, leaving it true and smooth. Then the board is inverted and passed through the machine again to true and smooth the other side.

With this machine, boards that are only slightly warped, or which are warped considerably, may be resurfaced so as to make them applicable for use in making furniture, frames, automobile bodies or other articles where true, even surfaces are essential. Also, the vertical adjustment provided for in the plane tables makes possible the removal of only what is required and avoids any wasting of material.

It is readily apparent that variations in details of construction could be made without departing from the spirit of the invention and for this reason, I do not wish the claims to be limited only to the details herein illustrated.

Having thus described my invention, what I claim as new therein and desire to secure by Letters Patent, is:

1. A machine of the character described comprising a frame structure, a revolving planer mounted across the frame, a plane table at one side of the planer across which material may be advanced to the planer, means for adjusting the table vertically for gauging the depth of the planed surface, a second table onto which the material is advanced from the planer, means for adjusting the second table vertically, a driven shaft supported above the frame, a pair of arms pivoted on the shaft to extend downwardly in opposite directions over the second table, shafts revolubly mounted in the ends of said arms, means for driving the latter shafts from the first mentioned shaft, feed rollers mounted on the second mentioned shafts to be driven thereby and adapted to engage material advanced across the table to feed it from the planer and to hold it tightly against the tables as it is advanced, a spring connecting the arms as a means for urging the rollers against the material and means for adjusting the arms and for limiting the distance to which the rollers may approach the plane table.

2. A machine of the character described comprising a frame structure, a revolving planer mounted across the frame, a plane table at one side of the planer across which material may be advanced to the planer, means for adjusting the table vertically, a second table onto which material is delivered from the planer, a standard on the frame, a shaft revolubly supported by the standard above the second table, a pair of arms pivotally supported on the shaft to extend downwardly in opposite directions over the second table, shafts mounted at the ends of the arms, means for driving the second mentioned shafts from the first shaft, feed rollers on the second shafts adapted to engage with material advanced from the planer to feed it across the table and to hold it tightly in contact with the table as it advances, yieldable means for urging the rollers downwardly, an arm pivotally mounted on one of the second shafts and extending over the first mentioned table, a feed roller mounted at the end of the arm to engage material at the other side of the planer to advance it to the planer and means for driving the last mentioned roller from the shaft on which the arm is mounted, and an adjusting mechanism for limiting the distance to which the last mentioned roller may approach the plane table.

Signed at Everett, Washington, this 19th day of March, 1927.

WILLIAM G. ZIMMERMAN.